(12) United States Patent
Kikkawa et al.

(10) Patent No.: US 7,780,933 B2
(45) Date of Patent: Aug. 24, 2010

(54) METHOD OF REMOVING SULFUR COMPOUNDS FROM NATURAL GAS

(75) Inventors: Yoshitsugi Kikkawa, Yokohama (JP); Noriyoshi Nozawa, Yokohama (JP); Hiroshi Inoue, Yokohama (JP); Etsuro Sato, Yokohama (JP)

(73) Assignee: Chiyoda Corporation, Yokohama-shi (JP)

( * ) Notice: Subject to any disclaimer, the term of this patent is extended or adjusted under 35 U.S.C. 154(b) by 91 days.

(21) Appl. No.: 11/995,038

(22) PCT Filed: Jun. 27, 2006

(86) PCT No.: PCT/JP2006/313180
§ 371 (c)(1),
(2), (4) Date: Jan. 8, 2008

(87) PCT Pub. No.: WO2007/007571
PCT Pub. Date: Jan. 18, 2007

(65) Prior Publication Data
US 2009/0130009 A1 May 21, 2009

(30) Foreign Application Priority Data
Jul. 8, 2005 (JP) .............................. 2005-199783

(51) Int. Cl.
*C01B 17/16* (2006.01)
*C10L 3/10* (2006.01)
(52) U.S. Cl. ...................... 423/220; 423/222; 48/127.3; 48/127.5; 48/127.7
(58) Field of Classification Search ................. 423/220, 423/573.1, 222; 48/127.3, 127.5, 127.7
See application file for complete search history.

(56) References Cited

U.S. PATENT DOCUMENTS

| 3,894,941 | A | * | 7/1975 | Bercik et al. | ................. | 208/290 |
| 4,175,928 | A | * | 11/1979 | Britton et al. | ............. | 48/197 R |
| 4,835,012 | A | | 5/1989 | Saur | | |
| 6,506,349 | B1 | * | 1/2003 | Khanmamedov | ........... | 423/210 |
| 6,692,711 | B1 | * | 2/2004 | Alexion et al. | .............. | 423/210 |
| 2005/0103194 | A1 | | 5/2005 | Huder et al. | | |
| 2006/0067875 | A1 | | 3/2006 | Koss et al. | | |

FOREIGN PATENT DOCUMENTS

| JP | 64-500094 A | 1/1989 |
| JP | 9-255974 A | 9/1997 |
| JP | 2000-503293 A | 3/2000 |
| JP | 2002-265964 A | 9/2002 |
| JP | 2005-518271 A | 6/2005 |
| WO | 03-092862 A1 | 11/2003 |

OTHER PUBLICATIONS

International Search Report of PCT/JP2006/313180, date of mailing Oct. 3, 2006.
Notification of Transmittal of Copies of Translation of the International Preliminary Report on Patentability (Form PCT/IB/338) of International Application No. PCT/JP2006/313180 mailed Sep. 18, 2008 with Forms PCT/IB/373 and PCT/ISA/237.

* cited by examiner

*Primary Examiner*—Timothy C Vanoy
*Assistant Examiner*—Michelle Hou
(74) *Attorney, Agent, or Firm*—Westerman, Hattori, Daniels & Adrian, LLP

(57) ABSTRACT

All sulfur compounds can be efficiently removed from natural gas that contains hydrogen sulfide and other sulfur compounds such as mercaptan without using physical absorption. The process comprises an absorption step of treating natural gas by means of a chemical absorption method using an amine-containing solution to mainly remove hydrogen sulfide and carbon dioxide, an adsorption step of flowing the natural gas from the absorption step through a packed bed of a molecular sieve to mainly remove mercaptan, a recovery step of recovering sulfur compounds by converting the hydrogen sulfide removed in the absorption step into sulfur by means of the Claus process, a regeneration step of desorbing the mercaptan adsorbed on the molecular sieve in the adsorption step using heated gas and a reaction step of converting the mercaptan in the regeneration exhaust gas exhausted from the regeneration step into hydrogen sulfide. The reaction step is conducted by injecting steam or water at a ratio of $H_2O/S=1$ to 5 (molar ratio) relative to the sulfur in the regeneration exhaust gas in the presence of a catalyst under the conditions of a temperature level of 250 to 400° C. and a pressure level of 1 to 10 MPa.

6 Claims, 3 Drawing Sheets

METHOD OF REMOVING SULFUR COMPOUNDS FROM NATURAL GAS

TECHNICAL FIELD

This invention relates to a method of removing sulfur compounds such as hydrogen sulfide and mercaptan from natural gas.

BACKGROUND ART

Natural gas is combustible gas that is produced from underground gas fields and contains hydrocarbons as principle ingredients. However, in addition to hydrogen and light hydrocarbons such as methane, propane and butane, natural gas also contains sulfur compounds such as hydrogen sulfide and mercaptan and heavy hydrocarbons such as BTX (benzene, toluene and xylene) as well as carbon dioxide, oxygen and nitrogen. Particularly, sulfur compounds including hydrogen sulfide give off sulfur dioxide when burnt so that it is strongly desired to remove sulfur compounds from natural gas from the viewpoint of protection of the environment.

Sulfur compounds such as hydrogen sulfide and mercaptan and carbon dioxide that are contained in natural gas as impurities are generally referred to as acidic gas. It has been a general practice to remove such acidic gas in the course of refining natural gas according to the requirements in application thereof. More specifically, when natural gas is liquefied to LNG, the concentration of carbon dioxide, that of hydrogen sulfide and that of all the sulfur compounds put together are required to be not higher than 50 ppm (in volume ratio), not higher than 4 ppm (ditto) and not higher than 30 mg-S/$Nm^3$, respectively. When natural gas is used as pipeline gas, the concentration of carbon dioxide need to be held to about 1% (in volume ratio) and sulfur compounds such as hydrogen sulfide and mercaptan have to be removed to a content level same as that of LNG.

Chemical absorption methods of absorbing acidic gas by means of an amine-based or carbonate-based alkaline aqueous solution are employed frequently as means for removing acidic gas from natural gas. When refining natural gas with this method, an amine process is popularly used because it is possible to optimize the refining system (in terms of the rate of circulation, the number of stages and the heat for regeneration) and reduce the cost. However, when mercaptan is contained in natural gas, it can hardly be removed by chemical absorption methods because mercaptan shows only a weak polarity and has only a weak bonding force relative to amine.

On the other hand, physical absorption methods of using an organic solvent prepared to absorb acidic gas components as a function of their respective partial pressures can absorb not only carbon dioxide and hydrogen sulfide but also other sulfur compounds such as mercaptan and disulfides. For example, the Sulfinol process of using a mixture of sulfolane and diisopropanolamine as absorbent solution is a combined type of a chemical absorption method and a physical absorption method that is being popularly used for absorbing and removing acidic gas from natural gas because it can efficiently remove hydrogen sulfide and mercaptan particularly when they are contained in natural gas to a large extent. However, since a physical absorption method generally absorbs not only acidic gas but also heavy hydrocarbons including BTX at the same time because of the nature of the absorbent solution it employs. Thus, when recovering sulfur from the separated acidic gas by means of the Claus process, there arises a problem that the sulfur recovery ratio is about 95% at most unless a tail gas treatment (TGT) is introduced because the acidic gas is accompanied by heavy hydrocarbons to a large extent. Additionally, there also arises a problem that soot is produced at a high rate in the sulfur recovery apparatus employing the Claus process.

In view of these problems, there has been proposed a technique of applying the Claus process not directly to the acidic gas separated by the physical absorption method in a sulfur recovery apparatus but after removing mercaptan, heavy hydrocarbons and carbon dioxide as off gas from the acidic gas. Then, the separated off gas is subjected to a hydrotreating process to convert mercaptan into hydrogen sulfide and the obtained hydrogen sulfide is subsequently processed by the Claus process (Jpn. Pat. Appln. Laid-Open Publication No. 9-255974. The sulfur recovery ratio is raised to 95 to 98% with this technique and further to about 99% when a TGT is introduced.

A technique of removing hydrogen sulfide and carbon dioxide by means of the chemical absorption method and subsequently using a molecular sieve to adsorb mercaptan that is not removed by the chemical absorption method is also known. With this technique, a dehydration tower is installed downstream relative to the acidic gas absorption apparatus that employs the amine process and a dehydration molecular sieve and a mercaptan adsorption molecular sieve are packed in the tower as upper and lower layers respectively (D. S. Clarke and P. W. Sibal, 77th Annual GPA Conversion, Mar. 16-18, 1998, Dallas Tex.). Since this technique does not use a physical absorption method for removing acidic gas from natural gas, heavy hydrocarbons are not absorbed and hence it is possible to raise the sulfur recovery ratio of the Claus process of recovering sulfur from the separated acidic gas. Additionally, it is possible with this technique to suppress the production of soot.

Furthermore, a technique of converting mercaptan in natural gas into hydrogen sulfide in advance and subsequently treating the natural gas by a chemical absorption method to remove hydrogen sulfide and carbon dioxide from the natural gas has also been developed. With this technique, mercaptan in natural gas is converted into hydrogen sulfide by injecting steam or water into natural gas to a ratio of 0.1 to 5 mol % relative to the natural gas under the condition of a temperature level of 260 to 350° C. and a pressure level of 4 to 10 MPa in the presence of a catalyst (Jpn. Pat. Appln. Laid-Open Publication No. 2002-265964). This technique provides advantages similar to those of the above described technique of adsorbing mercaptan by means of a molecular sieve because it does not involve the use of a physical absorption method.

DISCLOSURE OF THE INVENTION

The technique of separating hydrogen sulfide from other gas components in a hydrogen sulfide concentrator before introducing acidic gas separated from natural gas by means of a physical absorption method into a sulfur recovery apparatus using the Claus process requires the hydrogen sulfide concentrator to be installed as an additional facility. Additionally, it also requires an organic solvent to be circulated to a large extent relative to the gas to be absorbed by means of the physical absorption method. Thus, there arises a problem of high cost when all the acidic gas is removed by a physical absorption method.

With the technique of removing hydrogen sulfide and carbon dioxide by means of a chemical absorption method and subsequently adsorbing mercaptan that is not removed by the chemical absorption method by means of a molecular sieve, the mercaptan adsorbed by the molecular sieve is desorbed with water by means of hot regeneration gas (which is normally refined natural gas) in the regeneration cycle (phase) of a dehydration tower. While the produced regeneration exhaust gas contains condensed mercaptan, the sulfur recovery ratio falls and sulfur dioxide can be emitted if the exhaust gas is burnt. Therefore, mercaptan is absorbed by means of a physical absorption method, which may typically be the Selexol process that employs dimethylether of polyethylene glycol as absorbent solution, and sulfur is recovered by means of the Claus process. However, if refined natural gas is used as regeneration gas, heavy hydrocarbons are also absorbed with mercaptan when absorbing mercaptan from regeneration exhaust gas by means of the physical absorption method, to give rise to a problem similar to the problem that arises when treating natural gas by means of the physical absorption method.

The technique of converting mercaptan in natural gas into hydrogen sulfide in advance and subsequently treating the natural gas by a chemical absorption method to remove hydrogen sulfide and carbon dioxide from the natural gas requires a large reaction apparatus because the mercaptan conversion reaction has to be conducted on a large volume of gas that contains low concentration mercaptan. Additionally, this technique is accompanied by a problem that it is difficult to select conditions for maintaining a high reaction ratio.

According to the present invention, natural gas is treated sequentially by means of a chemical absorption method and a molecular sieve adsorption method to remove hydrogen sulfide and mercaptan from natural gas, while the regeneration exhaust gas from the molecular sieve adsorption method is made to react with water (steam) in the presence of a catalyst to convert mercaptan contained in the regeneration exhaust gas into hydrogen sulfide in order to raise the efficiency of conversion of mercaptan into hydrogen sulfide and, at the same time, make it possible to treat the regeneration exhaust gas by means of a chemical absorption method.

According to the present invention, there is provided a method of refining natural gas containing at least hydrogen sulfide and mercaptan as impurities by removing the impurities from the natural gas, characterized in that the method comprises: a first absorption step of treating natural gas by means of a chemical absorption method using an amine-containing solution to mainly remove hydrogen sulfide and carbon dioxide; an adsorption step of flowing the natural gas from the first absorption step through a packed bed of a molecular sieve to mainly remove mercaptan; a recovery step of recovering sulfur compounds by converting the hydrogen sulfide removed in the absorption step into sulfur by means of a Claus process; a regeneration step of desorbing the mercaptan adsorbed on the molecular sieve in the adsorption step using heated gas; and a reaction step of converting the mercaptan in the regeneration exhaust gas exhausted from the regeneration step into hydrogen sulfide; and that the reaction step is conducted by injecting steam or water at a ratio of $H_2O/S=1$ to 5 (mol ratio throughout the specification) relative to the sulfur in the regeneration exhaust gas in the presence of a catalyst under conditions of a temperature level of 250 to 400° C. and a pressure level of 1 to 10 MPa.

The catalyst to be used in the reaction step is preferably a CoMox catalyst. The regeneration exhaust gas that contains hydrogen sulfide and is produced from the reaction step can be treated by means of a chemical absorption method using an amine process. Then, a chemical absorption apparatus designed to treat acidic gas in natural gas may be used for the purpose of treating the regeneration exhaust gas from the reaction step. In other words, it is possible to embody the present invention by flowing the regeneration exhaust gas obtained from the reaction step into the chemical absorption apparatus that is provided for the main flow of treating natural gas and treating it with natural gas. Then, it is not necessary to install an additional chemical absorption apparatus. While an additional chemical absorption apparatus may be installed to exclusively treat the regeneration exhaust gas obtained from the reaction step apart from the chemical absorption apparatus that is provided for the main flow of treating natural gas, the efficiency of the entire process can be improved than ever if the regeneration tower, the solution tank and other equipment are shared because the same absorbent solution can be used for the two apparatus.

BEST MODE FOR CARRYING OUT THE INVENTION

Now, the present invention will be described in greater detail by referring to the accompanying drawings that illustrate a preferred embodiment of the invention. While the drawings illustrate a preferred embodiment of the invention, the present invention is by no means limited thereto.

Figure 1:
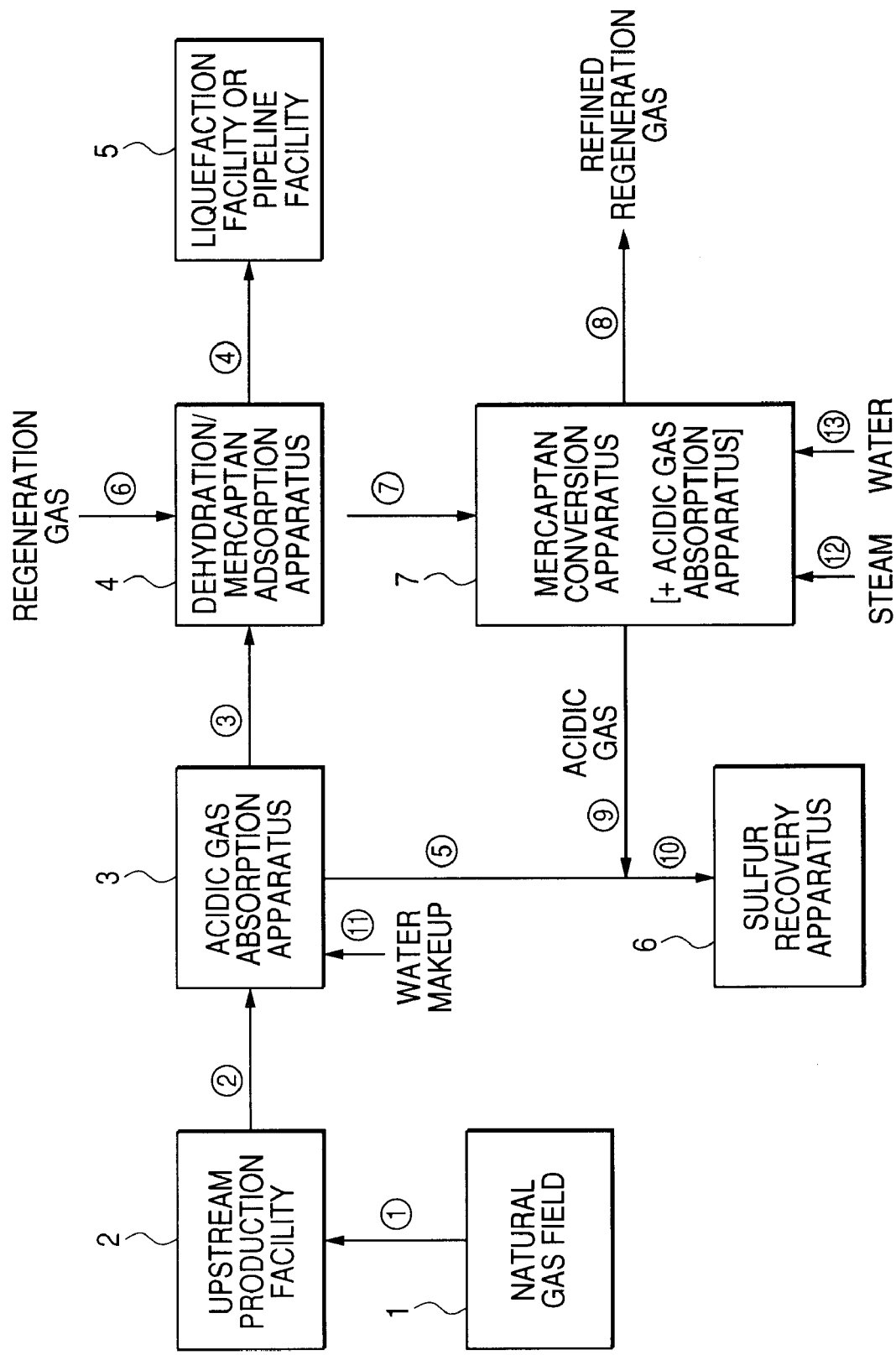
FIG. 1 is a schematic illustration of the process flow of the method according to the present invention.

FIG. 1 is a schematic illustration of the basic process flow from refining natural gas produced from a natural gas field to producing pipeline gas or LNG. The liquid components such as water and condensate (liquid hydrocarbons having a relatively small number of carbon atoms in each molecule) of the natural gas produced from natural gas field 1 is firstly separated and removed by an upstream production facility 2 to obtain only gas components. The natural gas now containing only gas components is then fed to an acidic gas absorption apparatus 3. Carbon dioxide and hydrogen sulfide are absorbed and removed from the natural gas through an amine process (chemical absorption method) in the acidic gas absorption apparatus 3 and subsequently moisture and mercaptan are adsorbed and removed from the remaining natural gas in a dehydration/mercaptan adsorption apparatus 4. The refined natural gas that is obtained in this way is then fed to a liquefaction facility or a pipeline facility 5 to produce LNG or pipeline gas. On the other hand, the carbon dioxide and the hydrogen sulfide absorbed by the acidic gas absorption apparatus 3 are treated by means of the Claus process in a sulfur recovery apparatus 6 so that sulfur compounds are recovered by converting the hydrogen sulfide into sulfur. The moisture and the mercaptan adsorbed by the dehydration/mercaptan adsorption apparatus 4 are regenerated as heated regeneration gas is made to flow through the apparatus 4. The regeneration exhaust gas produced from the dehydration/mercaptan adsorption apparatus 4 is made to react with water (steam) in a mercaptan conversion apparatus 7 in the presence of a catalyst so that the mercaptan contained therein is converted into hydrogen sulfide.

The acidic gas contained in the natural gas is absorbed and removed by the absorption tower that employs an aqueous amine solution in the acidic gas absorption apparatus 3. Since mercaptan is (and other organic sulfur compounds are) hardly absorbed by chemical absorption using an aqueous amine solution, only hydrogen sulfide and carbon dioxide are absorbed and removed by the absorption tower as acidic gas. Unlike physical absorption, heavy hydrocarbons are not absorbed either. An aqueous solution of any of various amines that are popular for the chemical absorption method may be used for the absorbent solution. Typical amines that can be used for the purpose of the present invention include diisopropanolamine (DIPA), methyldiethanolamine (MDEA), steric hindrance amine and MDEA activated by adding an additive. If compared with monoethanolamine (MEA) and diethanolamine (DEA) that are being popularly used, DIPA and MDEA show a strong selective absorption property for hydrogen sulfide so that they can preferably be used for sequentially absorbing hydrogen sulfide and carbon dioxide stepwise in a manner as will be described below. The amine concentration in the absorbent solution is typically about 4 mole % and may be regulated depending on the concentrations of the various acidic gases contained in the natural gas.

While it may be so arranged that hydrogen sulfide and carbon dioxide are absorbed by an aqueous amine solution at the same time in the above described absorption step, they are then stripped simultaneously when the absorbent solution is regenerated to consequently increase the quantity of gas to be treated in the sulfur recovery apparatus. Therefore, it is preferable to sequentially absorb hydrogen sulfide and carbon dioxide stepwise by adjusting the condition of absorption. The condition of absorption is adjusted by appropriately adjusting the type of amine to be used for the aqueous amine solution and the concentration of the aqueous amine solution according to the hydrogen sulfide/carbon dioxide ratio in the natural gas. The absorption tower may be divided into a hydrogen sulfide absorption section and a carbon dioxide absorption section that employ respective aqueous amine solutions of the same type and of the same concentration or alternatively a plurality of absorption towers that employ respective aqueous amine solutions of different types and different concentrations may be used.

Figure 3:
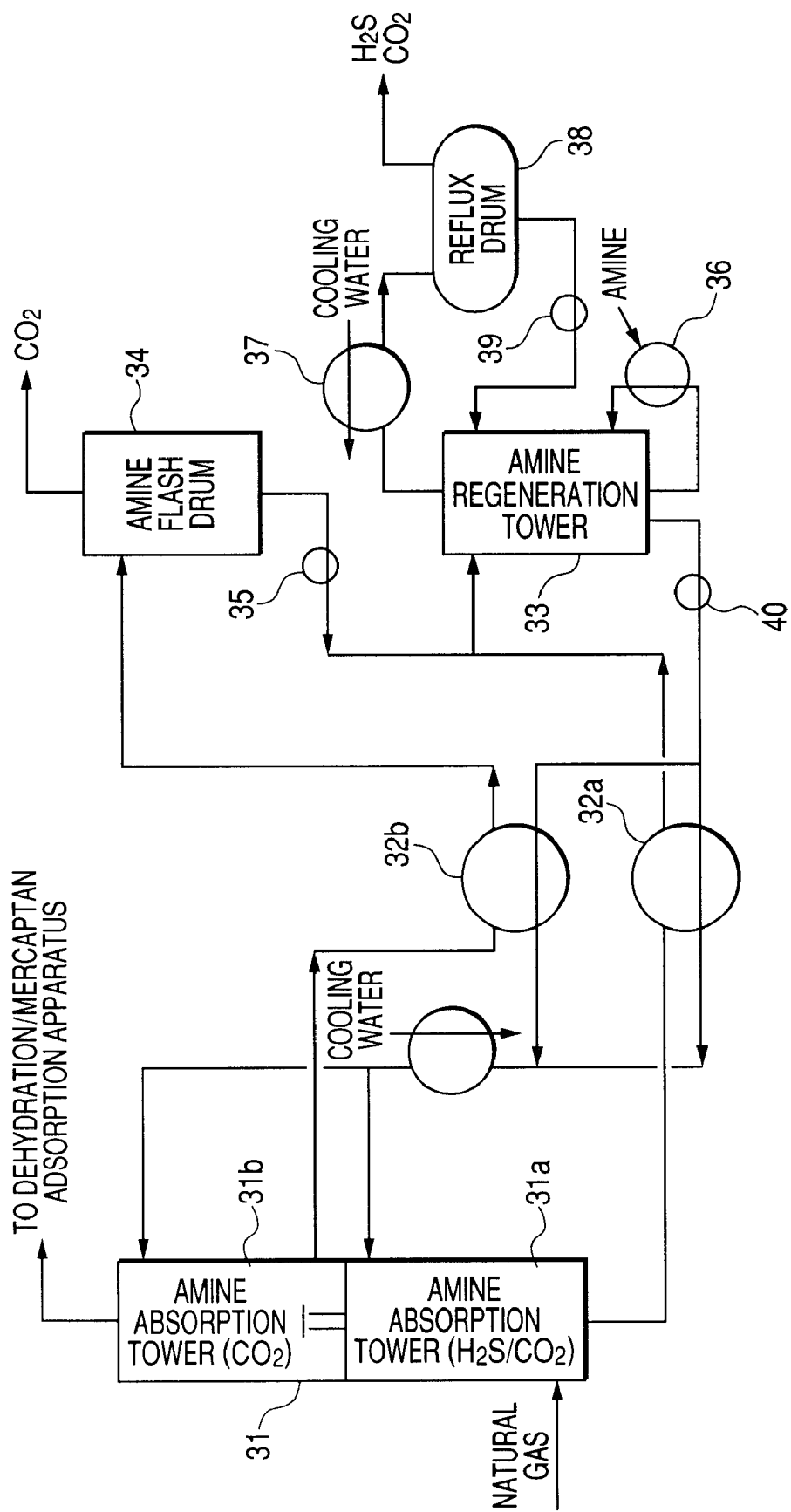
FIG. 3 is a schematic illustration of the process flow of the absorption step of the method according to the present invention.

FIG. 3 is a schematic illustration of the process flow of the sequential absorption step of the method according to the present invention. Referring to FIG. 3, the natural gas is brought into countercurrent contact with lean amine (an aqueous amine solution that does not absorb acidic gas to a considerable extent) in a lower part 31a of an amine absorption tower 31 at room temperature so that hydrogen sulfide is selectively absorbed and removed there to show a target concentration level (normally not higher than 4 ppm). Subsequently, the natural gas is brought into countercurrent contact with lean amine in an upper part 31b of the absorption tower 31 at room temperature in a similar manner so that carbon dioxide that has practically not been absorbed in the lower part 31a of the amine absorption tower 31 is mainly absorbed and removed there to show a target concentration level (normally not higher than 50 ppm in the case of LNG). The rich amine that has absorbed hydrogen sulfide in the lower part 31a of the absorption tower 31 (the aqueous amine solution that has absorbed acidic gas to a large extent) is made to pass through and heated in a lean/rich amine heat exchanger 32a and then enters an amine regeneration tower 33. On the other hand, the rich amine that has absorbed mainly carbon dioxide in the upper part 31b of the absorption tower 31 is made to pass through and heated in a lean/rich amine heat exchanger 32b and then enters an amine flash drum 34, where it strips carbon dioxide by means of low pressure flash to become semi-rich amine. Subsequently, the semi-rich amine is put together with the rich amine coming from the lower part 31a of the absorption tower 31 and fed to the amine regeneration tower 33 by means of an amine intermediate pump 35. The aqueous amine solution in the bottom section of the amine regeneration tower 33 is forced to circulate by means of an adjacently arranged amine reboiler 36 and heated typically by steam. The gas containing amine vapor and hydrogen sulfide and coming from the top section of the amine regeneration tower 33 is made to enter an amine condenser 37 and cooled typically by heat exchange with cooling water so that the amine vapor is mostly condensed and pooled in a reflux drum 38 before it is returned to the top section of the amine regeneration tower by means of a reflux pump 39. On the other hand, the hydrogen sulfide is left in the gas, which gas that is rich of hydrogen sulfide is then fed to the sulfur recovery step. The aqueous amine solution in the lower part of the amine regeneration tower is rich amine that has discharged most of the acidic gas absorbed by the amine solution. It is cooled by the lean/rich amine heat exchangers 32a and 32b to room temperature and subsequently fed to the lower part and the upper part of the absorption tower by an amine supply pump 40.

The dehydration/mercaptan adsorption apparatus 4 is a packed tower where a dehydration molecular sieve and a mercaptan adsorption molecular sieve are packed in the tower as upper and lower layers respectively. If it comprises a plurality of towers, it is possible to realize a continuous treatment by operating each of the towers alternately for adsorption and desorption. A Type 4A or Type 3A molecular sieve may be packed to a thickness of about 2,000 to 6,000 mm for the dehydration molecular sieve of the upper layer of each of the towers. On the other hand, a Type 13X or Type 5A molecular sieve may be packed to a thickness of about 3,000 to 6,000 mm for the mercaptan adsorption molecular sieve of the lower layer of each of the towers. In the adsorption cycle, natural gas that has been treated in the acidic gas absorption apparatus 3 is made to flow through the tower at a temperature level of 20 to 35° C., a pressure level of 20 to 100 bar and a flow rate of 0.04 to 0.20 m/sec. In the desorption cycle, clean gas (generally refined natural gas) that contains neither moisture nor sulfur compounds such as mercaptan is made to flow through the tower at a temperature level of 230 to 300° C., a pressure level of 10 to 50 bar and a flow rate of 0.04 to 0.20 m/sec. In the desorption cycle, mercaptan is desorbed first before water is desorbed because of the difference of adsorption potential. More specifically, while the temperature of the regeneration exhaust gas rises with time, the mercaptan concentration in the regeneration exhaust gas shows a peak relative to time. Regeneration gas is made to flow through the tower at room temperature in order to cool the tower when the desorption cycle is switched to the adsorption cycle.

The regeneration exhaust gas that is produced by the regeneration of the dehydration/mercaptan adsorption apparatus 4 is fed to the mercaptan conversion apparatus 7, where the sulfur compounds such as mercaptan contained in the regeneration exhaust gas are converted into hydrogen sulfide. This reaction is conducted by injecting steam or water at a ratio of $H_2O/S=1$ to 5 relative to the sulfur in the regeneration exhaust gas in the presence of a catalyst under the condition of a temperature level of 250 to 400° C. and a pressure level of 1 to 10 MPa. Unlike the ordinary reduction reaction, this reaction is characterized in that it does not require any reducing agent such as carbon monoxide or hydrogen. In other words, this reaction is to convert mercaptan ultimately into alkane and hydrogen sulfide in the presence of a catalyst by means of the effect of carbon dioxide in natural gas and newly added $H_2O$. This reaction is a complex parallel reaction and the individual element reactions are mostly to be studied. However, in the case of methyl mercaptan that is converted into hydrogen sulfide, it is believed that methyl mercaptan molecules are thermally decomposed to produce methyl radicals and mercapto radicals, which react with water molecules and with themselves to produce hydrogen sulfide and various intermediate products. Then, the various intermediate products are hydrolyzed to produce hydrogen sulfide, hydrocarbons, carbon monoxide, carbon dioxide and so on under the effect of the catalyst. In the case of the conversion reaction of methyl mercaptan, it may be safe to assume from the material balance before and after the reaction that a reaction as expressed by the formula below takes place.

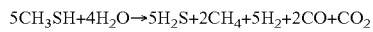

$$5CH_3SH+4H_2O \rightarrow 5H_2S+2CH_4+5H_2+2CO+CO_2$$

In the mercaptan conversion reaction according to the present invention, sulfur compounds other than hydrogen sulfide and mercaptan, which may be carbonylsulfide (COS), carbon disulfide and/or thiophenes, are reduced to hydrogen sulfide.

The above-described mercaptan conversion reaction can be conducted by using a known catalyst. Examples of catalysts that can be used for the purpose of the present invention include porous inorganic oxide carriers (alumina, silica, titania, boria, zirconia, silica-alumina, silica-magnesia, alumina-magnesia, alumina-titania, silica-titania, alumina-boria, alumina-zirconia, etc.) that are made to carry one or more than one active metals selected from the metals of Group V, Group VI and Group VII of the periodic table (e.g., vanadium, chromium, molybdenum, tungsten, cobalt, nickel, etc.). Particularly, a catalyst formed by making an alumina carrier to carry cobalt and molybdenum (CoMox reaction catalyst) is preferable because it is excellent in terms of catalyst activity and service life. Preferably, the selected catalyst is filled in the tower as granules and a fluidized bed is formed by causing a natural gas flow to flow upward from the tower bottom from the viewpoint of preventing local heating from taking place due to the exothermic reaction, although a fixed bed, an expanded bed or a reactor filled with a molded catalyst may alternatively be used depending on the nature of the natural gas to be treated.

The above-described mercaptan conversion reaction is conducted by injecting steam or water at a ratio of $H_2O/S=1$ to 5 relative to the sulfur in the regeneration exhaust gas under the conditions of a temperature level of 250 to 400° C. and a pressure level of 1 to 10 MPa. The conversion ratio of mercaptan and the selectivity for hydrogen sulfide fall when the reaction temperature is lower than 250° C., whereas the reaction progresses excessively to quickly degrade the catalyst when the reaction temperature exceeds 400° C. No practical reaction rate is achieved when the pressure level is lower than 1 MPa, whereas little effect is achieved for raising the reaction rate and the conversion ratio when the pressure level exceeds 10 MPa. The reaction does not progress sufficiently unless water or steam is added at least by 1 mol relative to 1 mol of sulfur in the regeneration exhaust gas, whereas only the energy necessary for heating increases but the reaction is not practically accelerated at all if water or steam is added by 5 mols relative to 1 mol of sulfur. The flow rate of regeneration exhaust gas relative to the unit quantity of the packed catalyst may well be about 2,000 to 20,000 $m^3/m^3$-h.

Clean dry gas that is extracted from the natural gas refining plant may be used as regeneration gas for regenerating the dehydration/mercaptan adsorption apparatus 4. Regeneration gas is heated by causing it to pass through a furnace or by way of heat exchange with the hot reaction gas coming from the mercaptan conversion apparatus 7 and subsequently introduced into the packed molecular sieve layer. As heated regeneration gas is caused to pass through, the packed molecular sieve layer is heated and the sulfur compounds such as mercaptan and the moisture that have been adsorbed are desorbed and driven off. Thus, the packed molecular sieve layer is regenerated. Since regeneration gas exchanges heat with the packed molecular sieve layer and loses heat, the temperature of regeneration exhaust gas is at the level of room temperature in the initial stages of the regeneration step but it rises to about 280° C. when the regeneration step ends because the packed molecular sieve layer is heated with time and the outlet temperature of the packed layer rises.

Water (steam) is added to the stream of regeneration exhaust gas and the stream is introduced into the mercaptan conversion apparatus (reactor) 7. Since the mercaptan conversion reaction is conducted at 250 to 400° C., the temperature of regeneration exhaust gas is not sufficiently high except that of the gas discharged in the final stages of the regeneration step. Therefore, regeneration exhaust gas has to be heated further before it enters the reactor. Additionally, regeneration gas that is initially at room temperature has to be also heated before it is fed into the dehydration/mercaptan adsorption apparatus 7. On the other hand, the regeneration exhaust gas coming out from the reactor has to be put into the acidic gas absorption apparatus at room temperature. Therefore, it is advantageous to subject the regeneration exhaust gas fed into the reactor or the regeneration gas fed into the dehydration/mercaptan adsorption apparatus 7 and the regeneration exhaust gas coming out from the reactor to heat exchange with each other.

Figure 2:
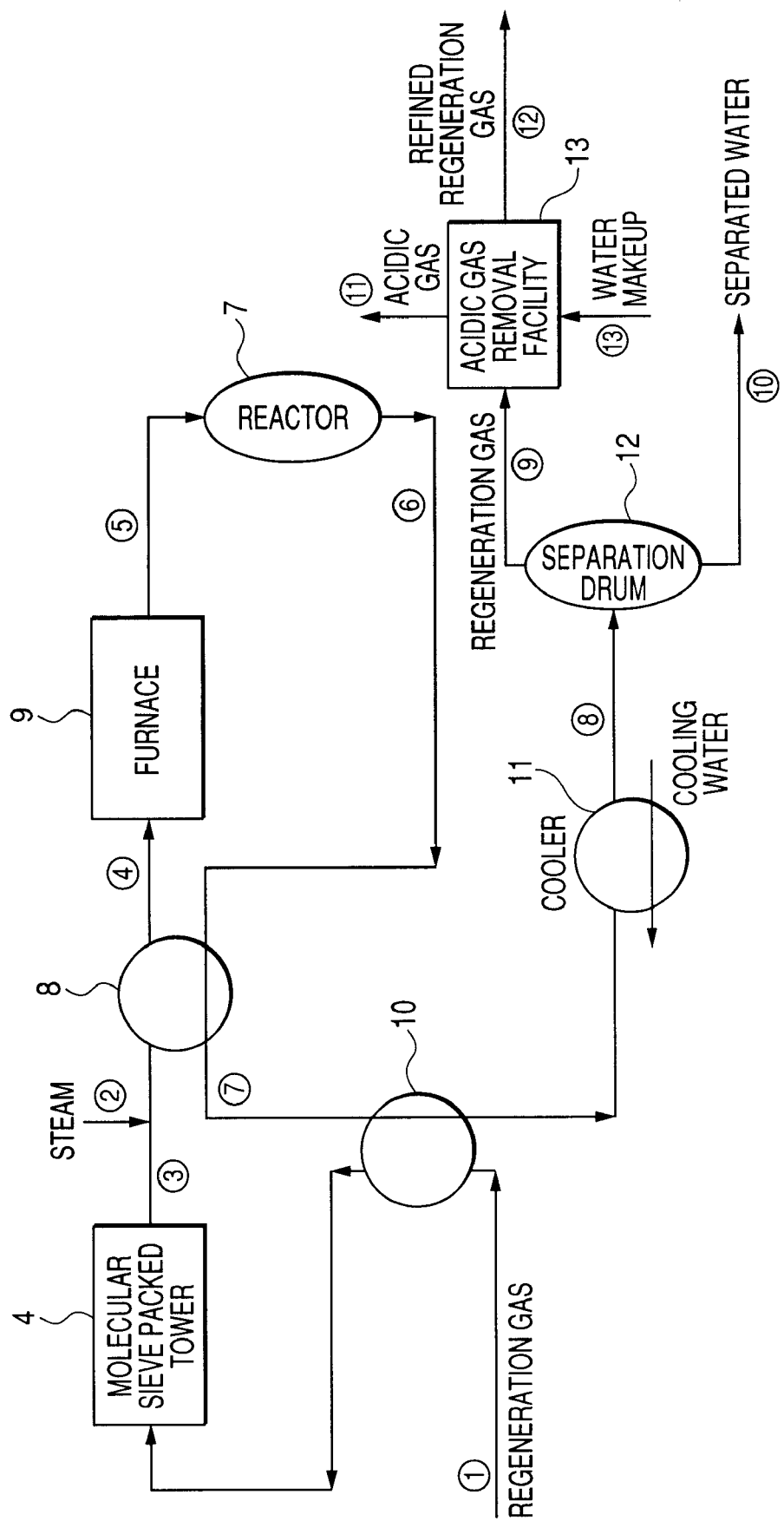
FIG. 2 is a schematic illustration of the process flow of the reaction step of the method according to the present invention.

FIG. 2 is a schematic illustration of the process flow of the reaction step of the method according to the present invention when such heat exchange is incorporated. Steam is added to the stream of regeneration exhaust gas coming from the dehydration/mercaptan adsorption apparatus 4 that is packed with molecular sieves at a predetermined rate and mixed with regeneration exhaust gas before the mixture is subjected to heat exchange with the stream of reaction gas from the reactor 7 in a gas/gas heat exchanger 8 and heated to about 100 to 280° C. Then, the regeneration exhaust gas is driven to pass through a furnace 9 so as to be heated to the temperature level necessary for the reaction, preferably to about 330 to 380° C., and introduced into the reactor 7. Since the mercaptan conversion reaction that takes place in the reactor 7 is an exothermic reaction, the gas temperature further rises by 3 to 10° C. The reaction gas that comes out from the reactor 7 is subjected to a heat recovery process in the above-described gas/gas heat exchanger 8 so as to be cooled to about 300° C. The reaction gas stream is further subjected to a heat recovery process in another gas/gas heat exchanger 10, where it exchanges heat with the regeneration gas brought into the dehydration/mercaptan adsorption apparatus 4. The cooled reaction gas stream is further cooled to room temperature by a cooler 11. The stream that is cooled to room temperature then enters a separation drum 12 and water that is condensed in the cooling process is separated, while the remaining stream is introduced to an acidic gas removal facility 13. The acidic gas absorption apparatus 3 for absorbing and removing hydrogen sulfide and carbon dioxide from natural gas as shown in FIG. 1 may be made to operate also as the acidic gas removal facility 13. If such is the case, the reaction gas stream that is cooled to room temperature is pressurized by means of a compressor and fed into the stream of natural gas entering the acidic gas absorption apparatus 3. It is preferable that the regeneration exhaust gas is returned to the process flow of natural gas particularly when the refined natural gas is partly employed as regeneration gas. Alternatively, the acidic gas removal facility 13 may be a stand alone apparatus for exclusively absorbing and removing hydrogen sulfide from the reaction gas that is cooled to room temperature. If such is the case, the reaction gas stream coming out from the acidic gas removal facility 13 may be put into the stream of refined natural gas or circulated as regeneration gas. Thus, it is possible to omit the conventional furnace arranged upstream relative to the dehydration/mercaptan adsorption apparatus 4 when the above-described system is employed.

Sulfur is recovered from hydrogen sulfide in the recovery step according to the present invention. The Claus process is a method that is typically used for the process of recovering sulfur compounds by converting hydrogen sulfide into sulfur. Thus, it can preferably be used for the purpose of the present invention. The Claus process is originally designed to produce sulfur by causing sulfur dioxide obtained by combusting part of a given amount of hydrogen sulfide and the remaining hydrogen sulfide to react with each other in a reaction furnace. However, the combustion cannot be stably maintained in the reaction furnace when the concentration of hydrogen sulfide is low in the crude material gas. Thus, a number of improved Claus processes have been proposed to realize a stable process if the concentration of hydrogen sulfide is low. An appropriate Claus process may be selected from the known Claus processes including the improved ones and used for the recovery step according to the present invention. However, it should be noted that a chemical absorption step and a mercaptan adsorption step precede the recovery step according to the present invention so that the gas fed to the recovery step shows a simple composition and contains only hydrogen sulfide and lowly concentrated carbon dioxide. In other words, there may be few elements, if any, that can give rise to a problem when the original Claus process is used and hence it may not be necessary to employ an improved complex Claus process. The simplest total supply system may be used to a great advantage from the viewpoint of cost when hydrogen sulfide and carbon dioxide are absorbed sequentially in the preceding absorption step and the absorbed carbon dioxide is stripped separately so that gas containing concentrated hydrogen sulfide may be used as crude material gas.

The gas from which hydrogen sulfide is removed by the Claus process is released as tail gas. The sulfur recovery ratio of the Claus process is about 95 to 99% and hence the tail gas contains sulfur that is not recovered. Therefore, if it is necessary to reliably raise the sulfur recovery ratio to above 99%, it is preferable to use a tail gas treatment (TGT) process such as a SCOT process. However, the method of the present invention provides a sulfur recovery ratio of not lower than 98% without adopting a TGT and hence the use of a TGT is not indispensable so that it is possible to make the overall process simple and low cost. In a SCOT process, all the sulfur components in tail gas except hydrogen sulfide (mainly containing sulfur dioxide and simple substances of sulfur along with COS and carbon disulfide to a lesser extent) are reduced to hydrogen sulfide, which hydrogen sulfide is then cooled to remove condensed water from the tail gas, so that the hydrogen sulfide in the gas may subsequently be removed by chemical absorption method. The chemical absorption apparatus of the absorption step according to the present invention may also be used for the SCOT process. It should be noted that the TGT may not necessarily be a SCOT process and some other process such as a Beavon process may alternatively be used for the purpose of the present invention.

Example

Table 1 shows the material balance and the process conditions of the natural gas refining process illustrated in FIG. 1 when typical natural gas is used. The stream numbers in Table 1 correspond to those of FIG. 1. Sulfur compounds include $H_2S$ and $CH_3SH$. Average values relative to time are shown for the material balances.

Table 2 shows the material balance and the process conditions of the mercaptan conversion apparatus of FIG. 2. The stream numbers in Table 2 correspond to those of FIG. 2. The material balances are those observed at the peak time of mercaptan desorption.

TABLE 1

| | Stream No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| | | | | | | temp. (° C.) | | | | | | | |
| | 45 | 45 | 45 | 45 | 45 | 45 | 150 | 45 | 45 | 45 | 45 | 300 | 45 |
| | | | | | | pressure (bar) | | | | | | | |
| | 100 | 70 | 65 | 64 | 1.1 | 31 | 29.5 | 26.5 | 1.1 | 30 | 65 | 30 | 30 |
| | | | | | | flow rate kgmol/h | | | | | | | |
| $CO_2$ | 200.0 | 200.0 | 0.0 | 0.0 | 200.0 | | | | 0.7 | 200.7 | | | |
| $H_2S$ | 100.0 | 100.0 | 0.0 | 0.0 | 100.0 | | | | 2.0 | 102.0 | | | |
| $N_2$ | 100.0 | 100.0 | 100.0 | 100.0 | | 100.0 | 100.0 | 100.0 | | | | | |
| $CH_4$ | 9000.0 | 9000.0 | 9000.0 | 9000.0 | | 900.0 | 900.0 | 901.3 | | | | | |
| $C_2H_6$ | 200.0 | 200.0 | 200.0 | 200.0 | | | | 0.0 | | | | | |
| $C_3H_8$ | 50.0 | 50.0 | 50.0 | 50.0 | | | | 0.0 | | | | | |
| $C_4+$ | 40.0 | 40.0 | 40.0 | 40.0 | | | | 0.0 | | | | | |
| $H_2O$ | 1.5 | 1.5 | 14.0 | 0.0 | 28.0 | | 14.0 | 3.5 | 1.3 | 29.3 | 40.5 | 40.0 | 47.8 |
| CO | 0.0 | 0.0 | 0.0 | 0.0 | | | | 0.0 | | | | | |
| $H_2$ | | | | | | | | 0.0 | | | | | |
| $CH_3SH$ | 2.0 | 2.0 | 2.0 | 0.0 | | | 0.0 | 0.0 | | | | | |
| $C_2H_4$ | | | | | | | | | | | | | |
| $CS_2$ | | | | | | | | | | | | | |
| COS | | | | | | | | | | | | | |
| Total | 9693.5 | 9693.5 | 9406.0 | 9390.0 | 328.0 | 1000.0 | 1014.0 | 1004.8 | 4.0 | 332.0 | 40.5 | 40.0 | 47.8 |

TABLE 2

| | \multicolumn{13}{c}{Stream No.} | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| | | | | | | | temp. (°C.) | | | | | | |
| | 45 | 300 | 150 | 280 | 350 | 353 | 280 | 45 | 45 | 45 | 45 | 45 | 45 |
| | | | | | | | pressure (bar) | | | | | | |
| | 31.0 | 31.0 | 29.5 | 29.5 | 29.0 | 28.5 | 28.0 | 27.0 | 27.0 | 27.0 | 1.1 | 26.5 | 27.0 |
| | | | | | | | flow rate kgmol/h | | | | | | |
| $CO_2$ | | | | | | 7.1 | 7.1 | 7.1 | 7.1 | | 7.1 | | |
| $H_2S$ | | | | | | 20.0 | 20.0 | 20.0 | 20.0 | | 20.0 | | |
| $N_2$ | 100.0 | | 100.0 | 100.0 | 100.0 | 100.0 | 100.0 | 100.0 | 100.0 | | | 100.0 | |
| $CH_4$ | 900.0 | | 900.0 | 900 | 900 | 912.5 | 912.5 | 912.5 | 912.5 | | | 912.5 | |
| $C_2H_6$ | | | | | | | | | | | | | |
| $C_3H_8$ | | | | | | | | | | | | | |
| $C_4+$ | | | | | | | | | | | | | |
| $H_2O$ | | 40.0 | | 40.0 | 40.0 | 25.6 | 25.6 | 25.6 | 3.9 | 21.7 | 2.6 | 3.9 | 2.6 |
| CO | | | | | | | | | | | | | |
| $H_2$ | | | | | | | | | | | | | |
| $CH_3SH$ | | | 20.0 | 20.0 | 20.0 | 0.0 | 0.0 | 0.0 | 0.0 | | | | |
| $C_2H_4$ | | | | | | | | | | | | | |
| $CS_2$ | | | | | | 0.0 | 0.0 | 0.0 | 0.0 | | | 0.0 | |
| COS | | | | | | | | | | | | | |
| Total | 1000.0 | 40.0 | 1020.0 | 1060.0 | 1060.0 | 1065.2 | 1065.2 | 1065.2 | 1043.6 | 21.7 | 29.7 | 1016.4 | 2.6 |

The invention claimed is:

1. A method of refining natural gas containing at least hydrogen sulfide and mercaptan as impurities by removing the impurities from the natural gas, characterized in that the method comprises:
    a first absorption step of treating natural gas by means of a chemical absorption method using an amine-containing solution to mainly remove hydrogen sulfide and carbon dioxide;
    an adsorption step of flowing the natural gas from the first absorption step through a packed bed of a molecular sieve to mainly remove mercaptan;
    a recovery step of recovering sulfur compounds by converting the hydrogen sulfide removed in the absorption step into sulfur by means of a Claus process;
    a regeneration step of desorbing the mercaptan adsorbed on the molecular sieve in the adsorption step using heated gas, creating a regeneration exhaust gas; and
    a reaction step of converting the mercaptan in the regeneration exhaust gas exhausted from the regeneration step into hydrogen sulfide, creating a reaction step exhaust gas; and
    that the reaction step is conducted by injecting steam or water at a ratio of $H_2O/S=1$ to 5 (mol ratio) relative to the sulfur in the regeneration exhaust gas in the presence of a catalyst under the conditions of a temperature level of 250 to 400° C. and a pressure level of 1 to 10 MPa;
    wherein the process precludes tail gas treatment, and the sulfur recovery ratio is not lower than 98%.

2. The method according to claim 1, wherein the catalyst is a CoMox catalyst.

3. The method according to claim 1, further comprising:
    a second absorption step of treating the reaction step exhaust gas discharged from the reaction step by means of the chemical absorption method using an aqueous amine solution to mainly remove hydrogen sulfide.

4. The method according to claim 3, wherein the first absorption step and the second absorption step are conducted in the same apparatus.

5. The method according to any one of claims 1 through 4, wherein the absorption step is divided into a step of mainly absorbing hydrogen sulfide and a step of mainly absorbing carbon dioxide.

6. The method according to any one of claims 1 through 4, wherein the regeneration exhaust gas stream to be supplied to the reaction step and the reaction step exhaust gas stream discharged from the reaction step are subjected to heat exchange with each other.

* * * * *